(12) United States Patent
Gelfuso

(10) Patent No.: US 7,993,185 B2
(45) Date of Patent: Aug. 9, 2011

(54) DEVICE FOR SMOOTHING THE SURFACES OF HARD OR SOFT MATERIALS

(76) Inventor: Russell Gelfuso, Cranston, RI (US)

(*) Notice: Subject to any disclaimer, the term of this patent is extended or adjusted under 35 U.S.C. 154(b) by 648 days.

(21) Appl. No.: 12/007,942

(22) Filed: Jan. 17, 2008

(65) Prior Publication Data

US 2008/0171496 A1    Jul. 17, 2008

Related U.S. Application Data

(60) Provisional application No. 60/880,725, filed on Jan. 17, 2007.

(51) Int. Cl.
  *B23D 71/02* (2006.01)
  *B24D 11/00* (2006.01)
(52) U.S. Cl. ..... 451/527; 15/93.1; 29/81.11; 407/29.13; 451/111; 451/553
(58) Field of Classification Search .......... 29/81.11; 407/29.1, 29.13; 451/111, 356, 357, 359, 451/527, 553; 15/93.1
See application file for complete search history.

(56) References Cited

U.S. PATENT DOCUMENTS

| | | |
|---|---|---|
| 992,437 A | 5/1911 | Metcalf |
| 1,411,936 A | 4/1922 | Salata |
| 2,043,509 A | 8/1935 | Easters |
| 2,994,942 A | 4/1953 | Harvell |
| 2,768,422 A | 10/1956 | McKenna |
| 3,086,277 A | 4/1963 | Hardy |
| 3,165,813 A | 1/1965 | Harvell |
| 4,423,571 A | 1/1984 | Selander |
| 4,639,989 A | 2/1987 | Filby |
| 5,056,203 A | 10/1991 | Miller |
| 5,123,139 A | 6/1992 | Leppert |
| 5,398,457 A | 3/1995 | Updegrave |
| 5,967,886 A | 10/1999 | Wuensch |
| 2007/0243029 A1* | 10/2007 | Oliver ................ 407/29.1 |
| 2007/0254560 A1 | 11/2007 | Woo |

* cited by examiner

Primary Examiner — Timothy V Eley
(74) Attorney, Agent, or Firm — Kenneth Bower

(57) ABSTRACT

The present invention is a finishing plate and method of fabricating a finishing plate. The finishing plate can be fabricated to various shapes, and can be used with various surfacing machines. In a preferred mode, the present invention is a disc cutting plate which can be used with a random orbital sander, and can be used to replace traditional abrasive sheets such as sandpaper. The present invention can be used in smoothing various materials including wood, painted wood, plastic, and various metals.

13 Claims, 8 Drawing Sheets

DEVICE FOR SMOOTHING THE SURFACES OF HARD OR SOFT MATERIALS

CROSS-REFERENCE TO RELATED APPLICATIONS

The present application claims the benefit of U.S. Provisional Application No. 60/880,725, filed Jan. 17, 2007.

SEQUENCE LISTING

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

Various means are available for mechanically smoothing the surfaces of materials. Rotary, vibratory, belt and orbital sanders, have various sanding surface shapes and sizes, and are often used for this purpose. The invention is described in terms of its application to random orbital sanders, rotary sanders, and orbital sanders. However, application to any surfacing machine is included in the field of the invention.

2. Description of Related Art

In the field of surface finishing, workers use various types of powered and manual abrading methods. In most cases, a worker will use replaceable sandpaper pads in conjunction with reciprocating or orbital machines. Generally, these methods produce a satisfactory finish on woods, painted woods, plastics or metals.

A problem faced by such workers is the cost associated with constantly replacing sand paper. These costs can mount both in the expense of the pads and in the time required to replace. The replacement time can be considerable, as workers often must traverse ladders and locate fresh pads. Moreover, as traditional abrading devices wear, they provide variable finish, which is not desirable. For example, a 40-grit sandpaper can start its useful life providing a proper coarse finish. However, the grit level immediately begins to degrade when the pad use begins. The 40-grit might perform like an 80-grit when the replacement time arrives.

Figure 1:
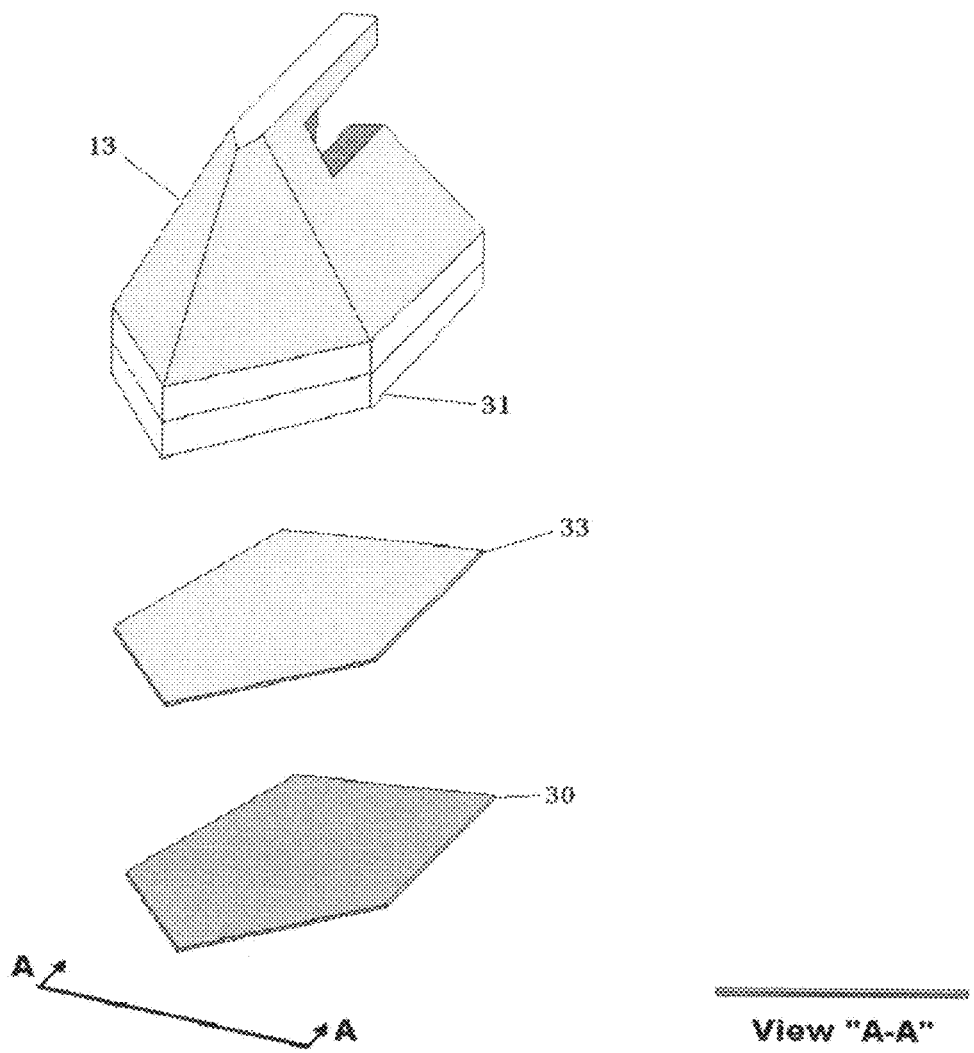

The prior art is replete with abrasives attached to flexible sheets. As an example, FIG. 1 illustrates the use of flexible sheets 30 coated with sheet back side 33 on one side with adhesive applied to the sheet back side 33. The flexible sheet 30 attached to the platen 31 of a manually operated or handheld orbital sander 13, which are known in the art of smoothing the surfaces of hard and soft materials. When smoothing soft material surfaces or low melting point surfaces, the sheet back side 33 becomes easily clogged with waste or amorphous material that can not be removed, resulting in premature failure and replacement. When smoothing hard material surfaces the sheet back side 33 often breaks down and loses the ability to remove material from the material surface resulting in premature failure and replacement. When smoothing soft and hard material surfaces simultaneously, i.e. a nail in a piece of wood, the flexible sheet 30 often tears also resulting in premature failure and replacement.

Figure 2:
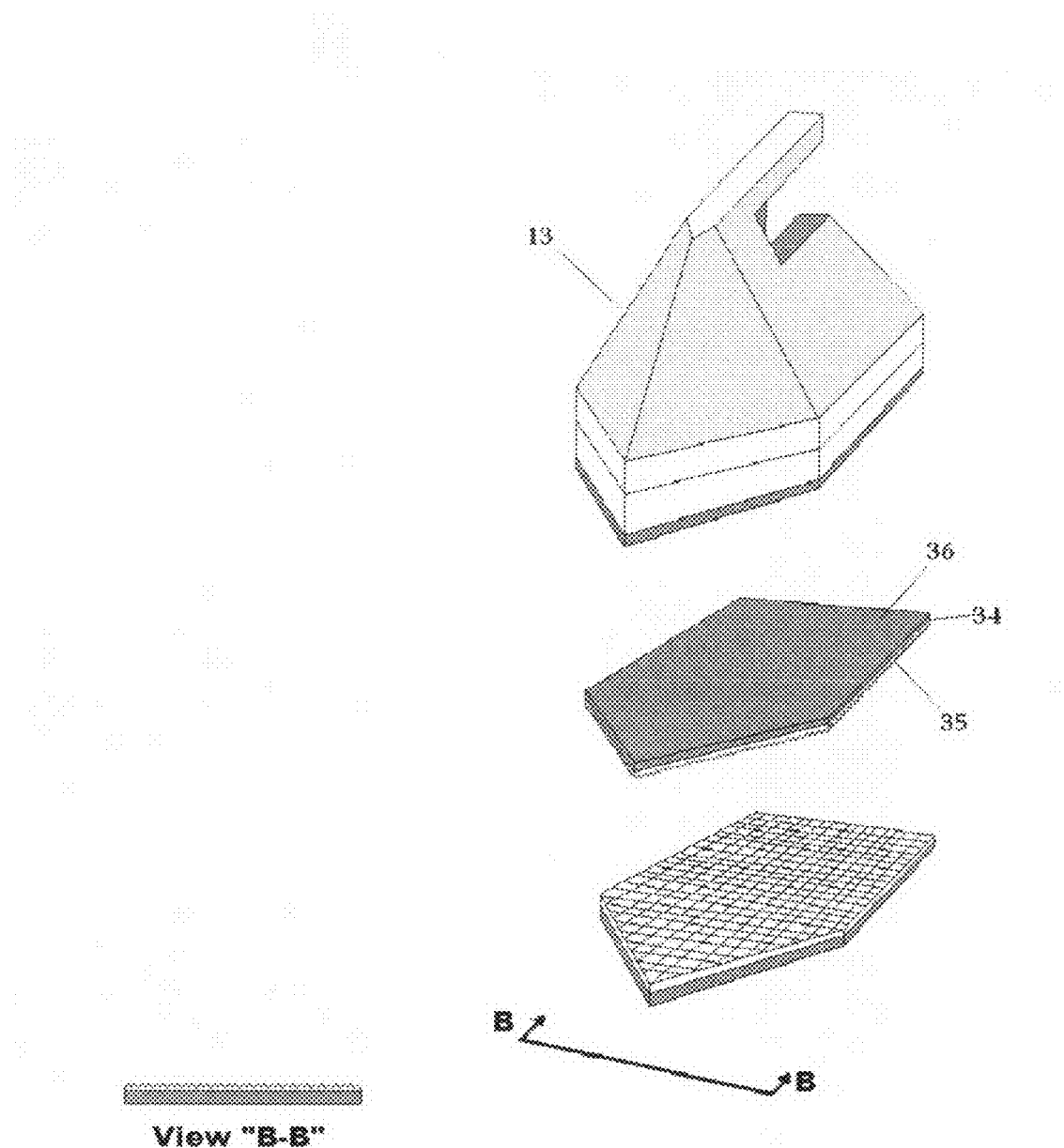

FIG. 2 illustrates advances over that of the flexible sheet 30 art that have addressed convenience and ease of replacement. A flexible sheet of metal 34 has one rough surface 35 and one flat surface having Velcro™ 36 adhesively attached thereto. Velcro™ 36 is also applied to the platen of the manually operated or handheld orbital sander 13. Although this advance addresses the issues of premature failure experienced with the coated flexible sheet 30 art, many performance, effectiveness, productivity, efficiency and convenience issues are not addressed.

Moreover, various attempts have been made in using metallic and other rigid cutters or abrasive discs. By way of example, U.S. Pat. No. 1,411,936 to Salata discloses a filing machine and U.S. Pat. No. 2,043,509 to Easters discloses a metal and wood surfacing tool. (936) to Salata shows only a device for reciprocating a conventional metal file back and forth, and is thus not intended for a random orbital machine. (509) to Easters shows a rotary filing machine which may work on wood. However, the complexity of the roller mechanism will make it susceptible to failure due to debris entering the machine.

A simpler method of facing a surface that alleviates the problems above is to attach files to rotary discs or to form file patterns in rotary discs. By way of example, U.S. Pat. No. 992,437 to Metcalf discloses a rotary file. U.S. Pat. No. 3,086,277 to Hardy discloses an abrasive finishing disk. U.S. Pat. No. 2,768,422 to McKenna discloses a file and method of making the same. U.S. Pat. No. 2,994,942 to Harvell discloses a motor operated vehicle body and fender file. U.S. Pat. No. 4,639,989 to Filby discloses a sanding tool. U.S. Pat. No. 5,056,203 to Miller shows an abrading and cutting tool assembly. U.S. Pat. No. 3,165,813 to Harvell discloses a rotary file. (989) to Filby provides a series of saw type blades on a rotary disc which may be used in conjunction with an orbital sander. However, the sparsely located teeth could not be used to provide a smooth finish on a wood surface. (277) to Hardy and (942) to Harvell show rotary files with replaceable cutters. They do not however, show rotary devices which are used for simultaneous smoothing and cutting. (422) to McKenna, (203) to Miller and (803) to Harvell show rotary files with continuous patterns. These devices cannot however be used to both remove and smooth material simultaneously.

A number of cutters and abraders have been combined with quick fasteners for rapid replacement of worn or damaged tools. By way of example, U.S. Pat. No. 4,423,571 to Selander discloses a quick change shoe assembly for a straight line sander. U.S. Pat. No. 5,967,886 to Wuensch discloses a hand power tool for flat machining. U.S. Pat. No. 5,123,139 to Leppert shows a buffing pad assembly. None of the above devices, however show a finishing plate which when used on a random orbital sander can both remove material and smooth material simultaneously.

To address the need to move an abrading device into a corner, a number of different shapes have been used. By way of example, U.S. Pat. No. 5,398,457 to Updegrave shows an edge and corner sanding attachment. This device, however does not show a hardened steel disc with multiple lines of cutting blades.

To address the shortcomings of traditional abrasive pads, abrasive manufacturers have also developed a number of structured abrasive products. By way of example, U.S. Published Application Number 20070254560 to Woo shows a structured abrasive article. While these systems provide certain benefits over traditional abrasives, they also have certain drawbacks. Since the points are "pyramidal" rather than angled, they cannot be used for simultaneous smoothing and cutting. Moreover, since they are abrasive, they work by way of friction. The same friction which causes the system to work also causes particles to build up, and thereby lose effectiveness. If the system comprised a series of smooth hardened cutting blades, the particle buildup problem could be alleviated because the blade relief surface would provide a low friction channel for debris to escape.

BRIEF SUMMARY OF THE INVENTION

The invention applies material and process technology developed for life time cutlery blades to provide a finishing plate to improve surface smoothing productivity. More specifically, the present invention is a finishing plate and method of fabricating said finishing plate which is used with various surfacing machines. In particular, the present invention can be manufactured as a disc cutting plate, a mouse cutting plate or other plates of various geometries. The surfacing machines which can be used include, but are not limited to: random orbital sanders, orbital sanders, vibratory sanders, and handheld power drills.

The finishing plate of the present invention can be used in finishing various materials including, but not limited to: wood, painted wood, varnished wood, plastic, aluminum, steel and other metals.

In a preferred embodiment, the finishing plate is essentially a round flat steel disc, or a disc cutting plate. The disc cutting plate has a first blade set and a second blade set. If desired, more blade sets could be added. Each blade set consists of parallel cutting blades ground into the disc cutting plate with a pitch of approximately 1/16" and blade depth of approximately 0.02" A cutting blade comprises three surfaces: a front rake surface, a blade relief surface and a back blade surface. The back blade surface is parallel to the disc back surface, and the front rake surface is orthogonal to the blade relief surface, and the back blade surface extends at approximately 45 degree angle to the blade relief surface of the adjacent blade.

Since each cutting blade in the blade set is linear and parallel to adjacent cutting blades, the cutting blades appear geometrically as chords on the circle created by the periphery of the disc cutting plate. And since the cutting blades have one cutting surface or front rake surface, some blades approach material on the workpiece with the front rake surface leading. Other cutting blades approach the workpiece with the blade back surface in the lead. Still other cutting blades approach the workpiece with varying angles of cutting or back areas in the lead. This affect provides for some cutting blades shearing material, while others smooth material. As cutting blades on one side are removing material, cutting blades on the other side smooth material.

In operation, the user would secure the disc cutting plate to a random orbital sander. He or she would start the sander and place it on the work piece. As the cutting blades are simultaneously rotated and orbited, the user would feel a slight pull from one direction to another as the cutting blades pass. As previously described, while cutting blades on one side of the disc cutting plate are shearing material, cutting blades on the opposite side are smoothing material. And since the disc cutting plate is a hardened steel plate with a smooth finish, chips and debris slide easily along the blade relief surface until the chips & debris are ejected out the side. This provides for significantly fewer clogging problems when compared to traditional abrasive pads. Moreover, since the disc cutting plate is hardened steel, or other hardenable material, it does not wear out quickly. In particular, if the disc cutting plate is hardened to Rockwell C 60-65, and the workpiece is wood, the disc cutting plate could last for 5-10 years.

The method of manufacturing this revolutionary disc cutting plate is described as follows. First a material, such as A2 tool steel is selected. Other materials, such as carbide, titanium, high speed steel, oil hardenable steel, or possibly even aluminum could be used. Next, a thin sheet of material—possibly 1/16"×6" is placed in a "creep feed grinder". The creep feed grinder has a grinding wheel with a profile that matches the blade set profile. So, when viewed from a direction that is orthogonal to the axis of the grinding wheel rotation, the inverse of an entire blade set would be seen along the top of the grinding wheel. Once secure in the machine, the grinding wheel is rotated about its own and a jet of grinder lubricating fluid is sprayed at the interface. The blank plate material is moved slowly beneath the grinding wheel. The blank material emerges after one pass with the first blade set ground into the plate front surface. The plate is then rotated 120 degrees, and the process is repeated. The resulting plate now has two blade sets ground into the front surface.

Next, the correct overall shape for the finishing plate is selected. In the preferred embodiment of this invention, this overall shape is a round disc. However, in a secondary embodiment, the shape known as the mouse could be selected. The mouse shape is the type which is used for finishing corner areas of floors. Other shapes are of course possible.

Finally, the finishing plate must be hardened. This process step depends on the material selected. In the case of A2 tool steel, the finishing plate can be hardened to over Rockwell C 60 by known methods of heating the steel to a certain temperature and allowing it to cool in air. Other possibilities exist for other materials. For example, aluminum could be hard anodized, or a tool steel could be quenched in a liquid.

There has thus been outlined the more important features of the invention in order that the detailed description thereof that follows may be better understood, and in order that the present contribution to the art may be better appreciated. There are additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to solve the aforementioned problems of the existing art particularly when applied to the smoothing of soft material surfaces such as wood or plastic having planar and certain non-planar surfaces.

It is also an object of the present invention to provide for the smoothing of surfaces of hard materials.

It is a further object of the present invention to provide for the smoothing soft and hard surfaces simultaneously.

It is a further object of the present invention to provide for simultaneous material removal and material smoothing.

Yet another object of the present invention is to provide a cutter which has uniform surface finishing characteristics over its lifetime.

It is yet another object of the present invention to provide a cutter which easily evacuates chips & debris as it is being used.

Yet another object of the present invention is to provide a cutting surface that is not easily deflected during cutting.

Still another object of the present invention is to provide a finishing plate which provides a finish comparable to those found when using traditional abrasives such as sandpaper.

It is yet another object of the present invention to provide for a cutting device which lasts much longer than sandpaper.

It is yet another object of the present invention to provide for a cutting device which can be quickly removed from a power tool and replaced with another cutting device.

Still another object of the present invention is to provide a finishing plate which reduces the overall costs of performing traditional construction jobs.

Yet another object of the present invention is to provide a finishing plate manufacturing method whereby different finish smoothness can be achieved by altering the pitch and blade height of the cutting blades.

BRIEF DESCRIPTION OF THE SEVERAL VIEWS OF THE DRAWING(S)

The invention will be better understood and objects other than those set forth above will become apparent when consideration is given to the following detailed description thereof. Such description makes reference to the annexed drawings wherein:

FIG. 1: Prior art showing a flexible sheet with an abrasive coating attached to a handheld vibratory or orbital sander.

FIG. 2: Prior art showing a metallic sheet attached to a handheld vibratory or orbital sander.

FIG. 3a-3f: Detail Views of the present invention formed as a Disc Cutting Plate.

FIG. 4a-4f: Preferred embodiment of the present invention used on a random orbital Sander.

Figure 5:
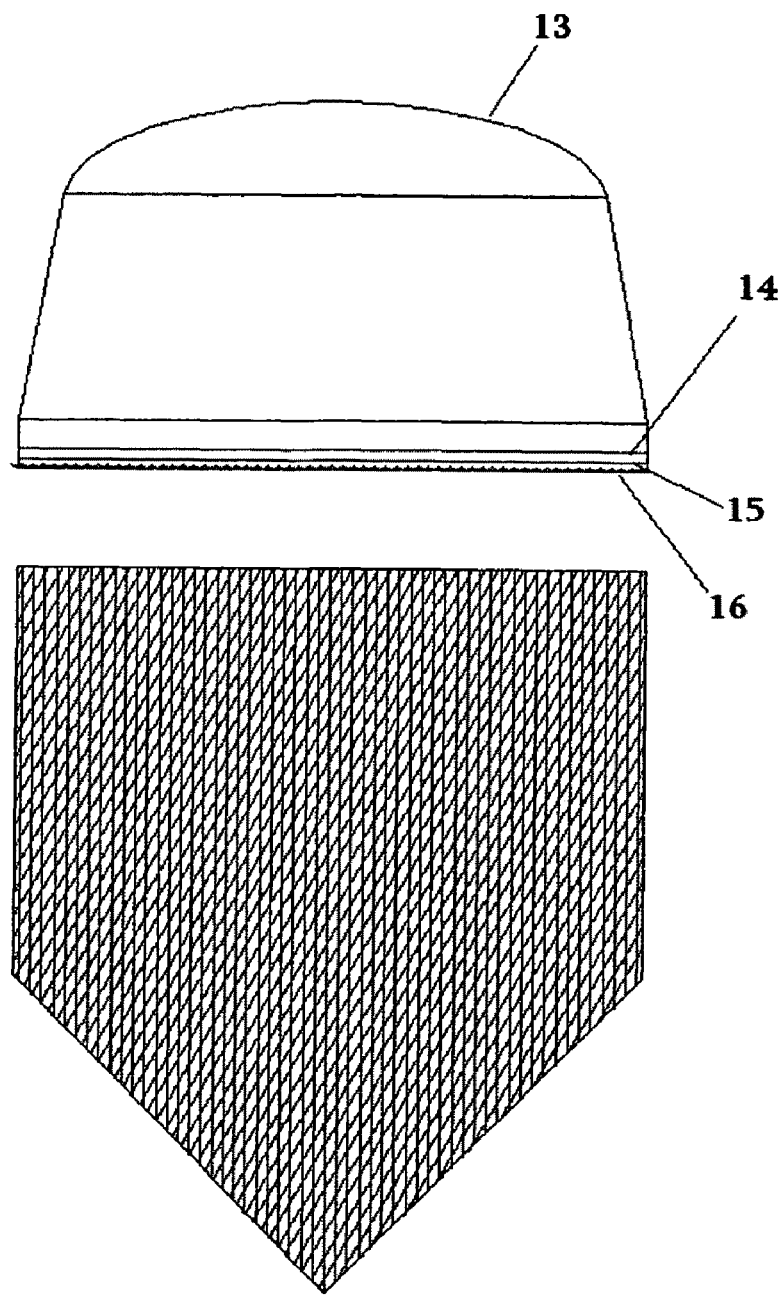

FIG. 5: Secondary embodiment of the present invention used a handheld orbital sander, where the cutting plate is formed as a cornering mouse.

Figure 6:
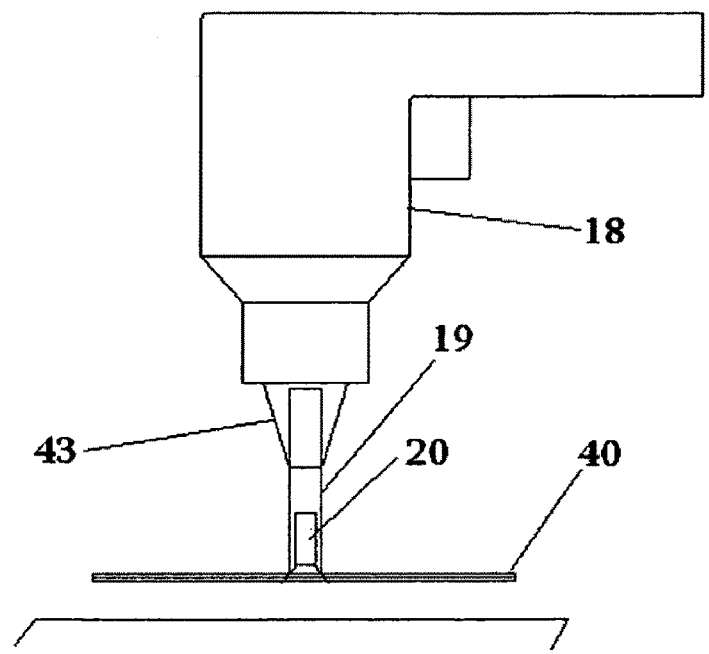
Figure 6:
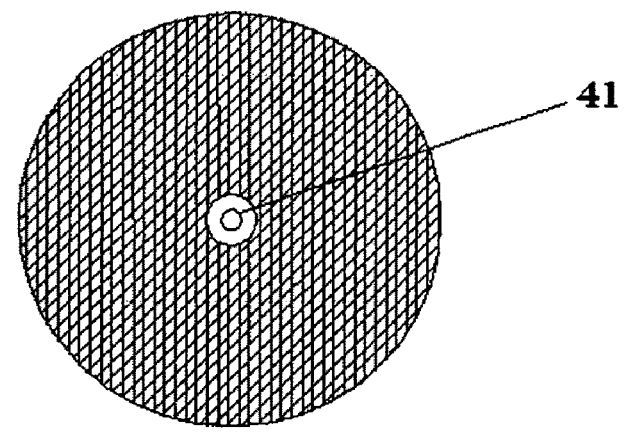

FIG. 6: Preferred embodiment of the present invention with a center hole added for mounting to a handheld power drill.

Figure 7:
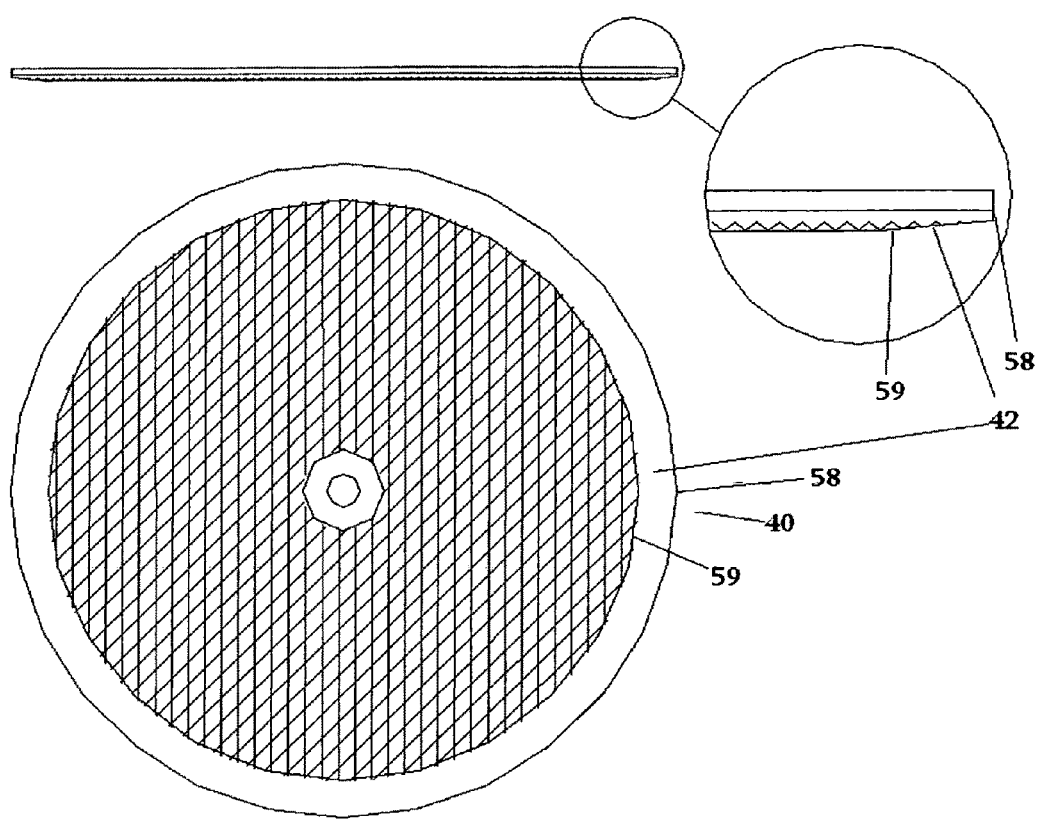

FIG. 7: Disc Cutting Plate with a Chamfer added to the outer periphery.

FIG. 8a-8c: Side and End Views of the Creep feed Grinder and Grinding Wheel.

DETAILED DESCRIPTION OF THE INVENTION

Figure 3:
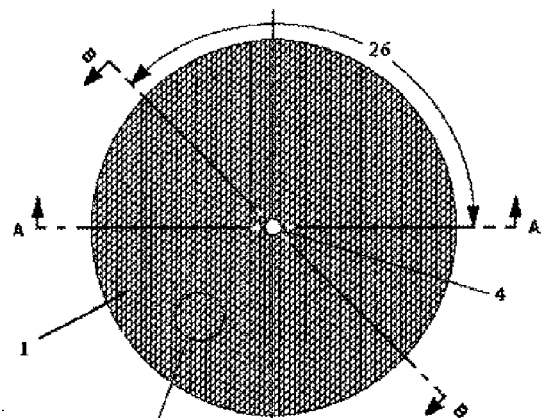
Figure 3:
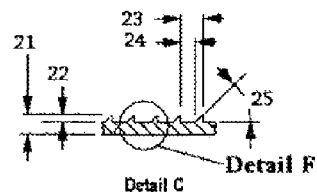
Figure 3:
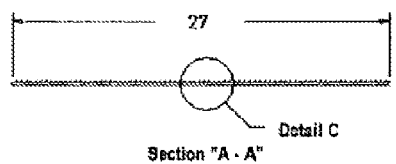
Figure 3:
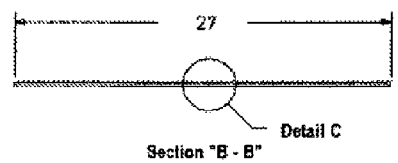
Figure 3:
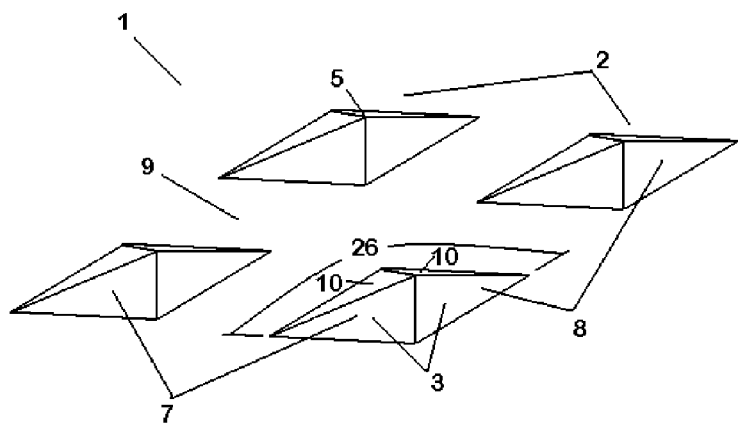
Figure 3:
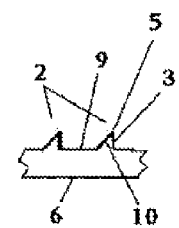

Referring now to FIGS. 3 the present invention is shown in its preferred embodiment. FIG. 3a shows a bottom view of a disc cutting plate 1. In this embodiment, the disc cutting plate 1 can be used with a commercially available surface finishing machine having a platen that is circular. The disc cutting plate 1 is made of a hard material, harden-able material or is coated with a hard coating for long blade life and low friction when performing a surface finishing operation on a surface. As seen in FIG. 3a and 3b, the disc cutting plate 1 has an essentially circular periphery and also a center locating hole 4. The periphery can have a chamfer or radius on the plate outer edge to improve the surface quality of the surface being smoothed. Although the preferred method of attaching the disc cutting plate 1 to the surface finishing machine via hook & loop material, other attachment means can be used, including adhesive or threaded fasteners.

FIG. 3b shows a cross section of disc cutting plate 1 through section "A-A" As seen, disc cutting plate 1 has a plate diameter 27 of approximately 5" a first blade set 7 protruding therefrom.

Referring now to FIG. 3c and FIG. 3f, where enlarged views of the disc cutting plate 1 are shown. The disc cutting plate 1 has a plate back surface 6 which is parallel to the surface being smoothed when in operation. Disc cutting plate 1 has a plate thickness 21 which can be approximately 1/16", and plate thickness 21 is essentially unchanged over the entire disc cutting plate 1. The cutting blade 2 can have blade height 22 of approximately 0.02", and pitch 23 of approximately 0.06". A front rake surface 3 extends from a blade tip 5 to a blade relief surface 9. The blade relief surface 9 extends a distance of blade relief width 24 of approximately 0.04". The front rake surface 3 is orthogonal to plate back surface 6. A blade back surface 10 extends at back blade angle 25 of approximately 45 degree angle from the blade tip 5 to the blade relief surface 9 of the adjacent cutting blade 2. Each cutting blade has an essentially equal blade relief width 24.

FIG. 3d shows a cross section of disc cutting plate 1 through section "B-B" of the present invention. A second view of the cutting blades 2 viewed in this direction is substantially the same dimensions shown in FIGS. 3c and 3f.

Referring now to FIG. 3e, the disk cutting plate 1 has cutting blades 2 protruding from the blade relief surface 9. Each of the cutting blades has two blade back surfaces 10 and two front rake surfaces 3. There is a first cut rake surface 7 and a second cutting surface 8 on each cutting blade 2. The two front rake surfaces 7 and 8 meet at blade crossing angle 26 of approximately 120 degrees. It is a appreciated that blade crossing angle 26 can be varied. Moreover, additional blade sets could be added at various other angles.

In experimentation the inventor has observed that the blade height 22 of 0.02" and pitch 23 of 0.06" provides a finish on the surface being smoothed which corresponds to coarse or 40 grit sandpaper. The pitch 23 of adjoining blades is illustrated as being essentially equal but may vary to facilitate special cutting requirements. Moreover, the blade height 22 and pitch 23 can be decreased to provide a finish on surface being smoothed which corresponds to fine or 80-120 grit sandpaper.

Figure 4:
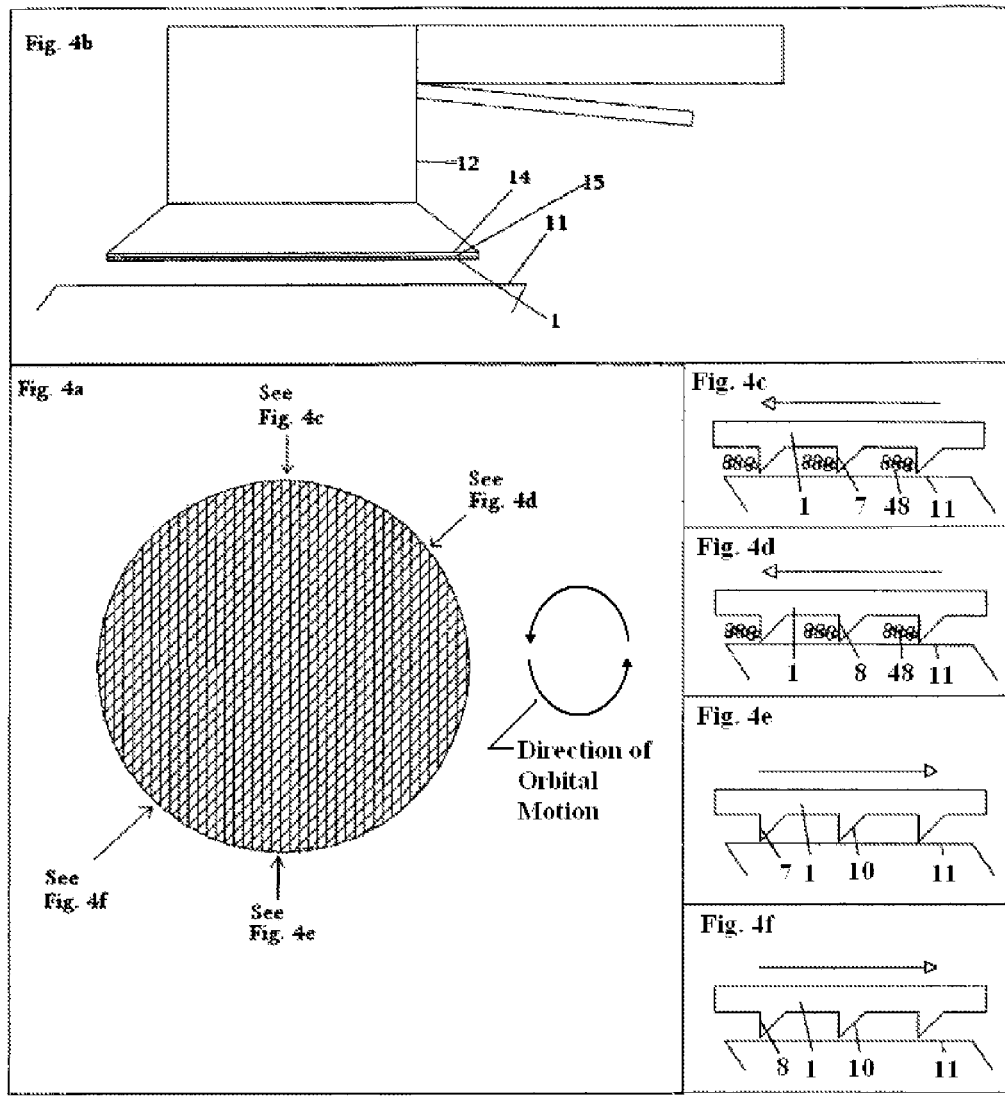

Referring now to FIG. 4, the preferred embodiment of the present invention is shown attached to the random orbital sander 12. The disc cutting plate 1 is manufactured as shown in FIG. 3a-f. FIG. 4a is a bottom view of the disc cutting plate, and FIG. 4b is a sideview of the disc cutting plate 1 mounted to the random orbital sander 12. FIGS. 4c-f show side views of the cutting blade 2 interacting with the workpiece 11. The random orbital sander 12 has a circular platen 17 which is covered with hook attachment 14 of the conventional type, commonly referred to as Velcro. Disc cutting plate 1 has mating loop attachment 15 for releasable attachment to the hook attachment 14 of round platen 17. Once disc cutting plate 1 is secured to the round platen 17, the random orbital sander 12 is activated. Prior to pressing on the workpiece 11, the circular platen will rotate at a high rate of speed. Once pressure is applied to the workpiece 11 with disc cutting plate 1, the circular platen rotational speed will slow, and the circular platen will move in an orbital motion of the type commonly known. The first cutting blades 7 and second cutting blades 8 will both remove chips & debris 48 from the workpiece 11 and smooth workpiece 11.

The simultaneous removal and smoothing will be better understood when referring to FIG. 4c-f. As seen in FIG. 4c, an enlarged side view of the first cutting blades 7 travels right to left as a result of the counter-clockwise rotation of the disc cutting plate 1. Since the front rake surface 3 approaches the workpiece 11, an amount of chips & debris 48 are produced. Next, as seen in FIG. 4d an enlarged side view of the second cutting blades 8 travels right to left as a result of the counter-clockwise rotation of the disc cutting plate 1. Since the front rake surface 3 approaches the workpiece 11, an amount of chips & debris 48 are produced. Next, as seen in FIG. 4e, an enlarged side view of the first cutting blades 7 travels left to right as a result of the counter-clockwise rotation of the disc cutting plate 1. Since the blade back surface 10 approaches the workpiece 11, no chips & debris are produced. Rather, the rubbing of the blade tip 5 and the blade back surface 10 on the workpiece 11 causes a smoothing effect on the workpiece 11. Finally, as seen in FIG. 4f, an enlarged side view of the second cutting blades 8 travels left to right as a result of the counter-clockwise rotation of the disc cutting plate 1. Since the blade back surface 10 approaches the workpiece 11, no chip & debris are produced. Rather, the rubbing of the blade tip 5 and the blade back surface 10 on the workpiece 11 causes a smoothing effect on the workpiece 11.

Referring now to FIG. 5, a second embodiment of the present invention is shown. A finishing plate can be formed as a mouse cutting plate 16. The mouse cutting plate 16 is manufactured with the same tooth profile as shown in FIG. 3a-e. Rather than manufacturing a round plate, the mouse cutting plate 16 has a corner profile which enables use in corners where disc cutting plate 1 could not reach. The hook attachment 14 is attached to the platen of a handheld orbital sander 13. The loop attachment 15 is attached to the mouse cutting plate 16. The hook attachment 14 and the loop attachment 15 together are also known as Velcro.

Referring now to FIG. 6, a third embodiment of the present invention is shown. A finishing plate can be formed as a second disc cutting plate 40, which is substantially similar to the disc cutting plate 1. A disc plate thru-hole 41 is added to the center of the second disc cutting plate 40. A shaft mounting screw 20 is then inserted through the disc plate thru-hole 41, and into stub shaft adapter 19. The stub shaft adapter 19 is then tightened into the drill chuck 43 of a handheld power drill 18. The present invention can then be used for various additional surfacing finishing operations including those where the user has only the handheld power drill 18 available.

Referring now to FIG. 7, the disc cutting plate 1 or the second disc cutting plate 40 can have an outer periphery chamfer 42 added around the entire outer edge. As seen, the cutting blade 2 will gradually be removed from an inner chamfer ring 59 to an outer disc edge 58. With the outer periphery chamfer 42, the disc cutting plate 1 and the second disc cutting plate 40 will have less tendency to dig into the workpiece 11 in the area of the outer disc edge 58.

Figure 8:
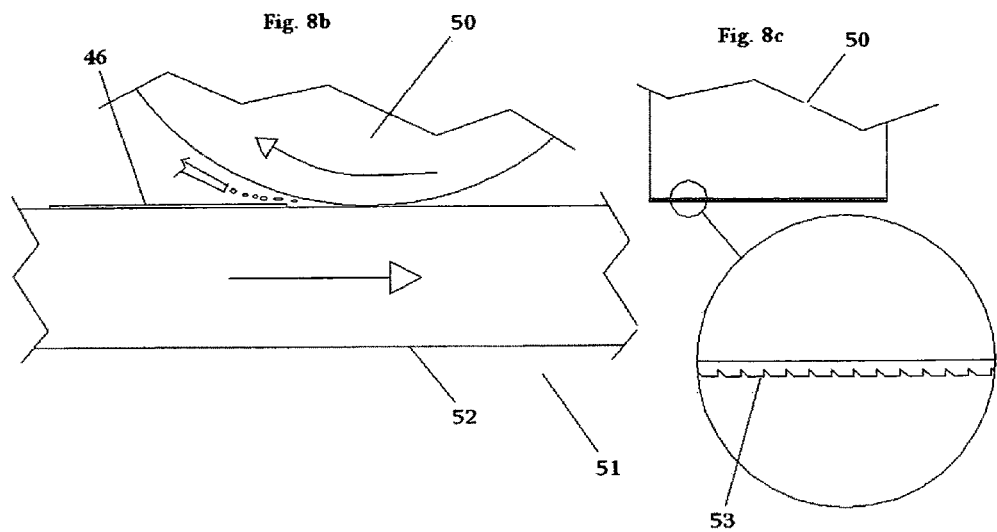
Figure 8:
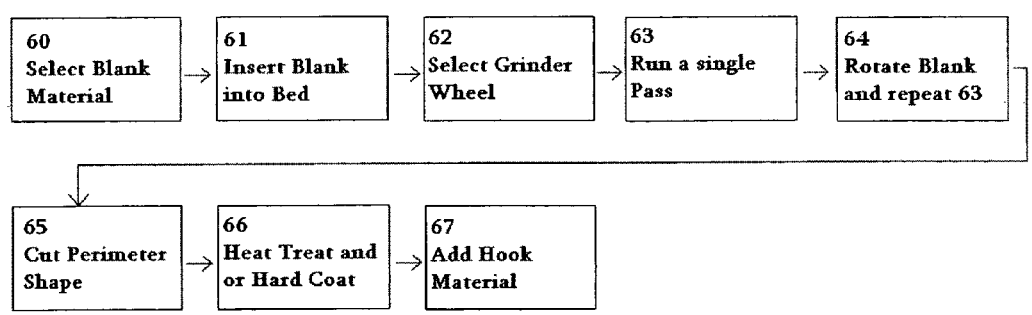

Referring now to FIG. 8, the manufacturing method and machinery are shown. FIG. 8a shows the method, FIG. 8b shows a side view of a creep feed grinder 51, and FIG. 8c shows an end view of the creep feed grinder 51. First a blank sheet 46 is selected of appropriate cutter material 47. Next, the blank sheet 46 is secured to the machine bed 52 of the creep feed grinder 51. A grinding wheel 50 is secured to the spindle of the creep feed grinder 51, and the grinding wheel 50 is rotated at an appropriate speed. Grinding fluid 54 is sprayed at a high speed toward the interface of grinding wheel 50 and blank sheet 46. Next, the machine bed 52 is passed from left to right as seen in FIG. 8b. As seen in the end view FIG. 8c, the grinding wheel 50 has multiple grinding wheel teeth 53 which are the reverse of both the first blade set 7 and the second blade set 8. After one pass through the creep feed grinder 51, the blank sheet 46 will have the first blade set 7. Next, the blank sheet 46 is removed from the machine bed 52 and is rotated 120 degrees, and is re-secured to the machine bed 52. The process described above is repeated, which adds the second blade set 8.

The invention claimed is:

1. A finishing plate for fitting to a platen of a surfacing machine, comprising:
   a rigid metal plate with a plate thickness sufficient to be rigid for a surface finishing operation;
   wherein, the plate thickness is uniform over the rigid metal plate;
   wherein, the rigid metal plate has a plate width substantially larger than the plate thickness;
   wherein, the plate width is for conforming to the width of a platen of a surfacing machine;
   wherein, the rigid metal plate has a plate back surface;
   wherein, the rigid metal plate has a plate front surface;
   wherein, the plate front surface is on the opposite side of the rigid metal plate from the plate back surface;
   wherein, the plate front surface is parallel to the plate back surface;
   an attachment means for releasably securing the plate back surface to the platen;
   a plurality of cutting blades formed into the plate front surface;
   a plurality of first blade front rake surfaces formed into the plurality of cutting blades;
   a plurality of second blade front rake surfaces formed into the plurality of cutting blades;
   wherein, the first blade front rake surfaces are arranged in parallel relation to each other on the plate front surface;
   wherein, the blade front rake surfaces are arranged in parallel relation to each other on the plate front surface;
   wherein, the cutting blades, a blade back surface and a blade relief surface;

wherein, the cutting blades span the plate front surface;

wherein, the cutting blades have a blade tip at the intersection of the front rake surface and the blade back surface;

wherein, the cutting blades have a blade bottom at the intersection of the front rake surface and the blade relief surface;

wherein, the cutting blades have a blade height that is the distance from the blade tip to the blade bottom;

wherein, the cutting blades have a pitch that is the shortest distance between a blade tip and an adjacent blade tip in the blade set;

wherein, the cutting blades front rake surfaces are arranged in parallel on the plate front surface;

wherein, the second blade front rake surfaces intersect the first blade front rake surfaces at a front rake surface intersecting angle.

2. The finishing plate of claim 1, wherein:
the first blade front rake surface and the second blade front rake surfaces are orthogonal to the plate back surface.

3. The finishing plate of claim 1, wherein:
the rigid metal plate has a perimeter shape of a circular disc.

4. The finishing plate of claim 3 wherein:
the rigid metal plate has an aperture in the geometric center of the circular disc.

5. The finishing plate of claim 1, wherein:
the attachment means is selected from an affixing group consisting of: i. adhesives, ii. clasps, iii. fasteners, iv. holes, v. loops, vi. magnets, vii. screws, viii. hook and loop and/or combinations thereof.

6. The finishing plate of claim 1, wherein:
the rigid metal plate has a perimeter shape of a five sided polygon.

7. The finishing plate of claim 6 wherein:
the attachment means is selected from an affixing group consisting of: i. adhesives, ii. clasps, iii. fasteners, iv. holes, v. loops, vi. magnets, vii. screws, viii. hook and loop and/or combinations thereof.

8. The finishing plate of claim 1 wherein:
the rigid metal plate is heat treated.

9. The finishing plate of claim 1 wherein:
the rigid metal plate is hard coated.

10. The finishing plate of claim 1 wherein:
the attachment means is Velcro.

11. The finishing plate of claim 1 wherein:
the first blade front rake surface and the second blade front rake surfaces are orthogonal to the plate back surface;
the blade height is 0.02";
the blade pitch is 0.06".

12. The finishing plate of claim 1 wherein:
the first blade front rake surface and the second blade front rake surfaces are orthogonal to the plate back surface;
the blade height is 0.01";
the blade pitch is 0.03".

13. The finishing plate of claim 1 wherein:
the first blade front rake surface and the second blade front rake surfaces are orthogonal to the plate back surface;
the blade height is 0.02";
the blade pitch is 0.06";
the rigid metal plate has an aperture in the geometric center of the circular disc;
the rigid metal plate has a countersink or a counter bore for accommodating the head of a shaft mounting screw;
the shaft mounting screw passes through the aperture and into a stub shaft adapter;
the stub shaft adapter having a cylindrical outer shape for attachment to a drill chuck;
the stub shaft adapter having an internal threaded hole for releasable attachment to the shaft mounting screw;
the rigid metal plate is heat treated.

* * * * *